United States Patent [19]
Storm

[11] Patent Number: 5,960,739
[45] Date of Patent: Oct. 5, 1999

[54] BED FOR ANIMALS

[75] Inventor: Soren Storm, Woodinville, Wash.

[73] Assignee: Scandinavian Computer Furniture, Inc., Redmond, Wash.

[21] Appl. No.: 08/957,857

[22] Filed: Oct. 27, 1997

[51] Int. Cl.⁶ .......................... A01K 1/035; A47C 19/16
[52] U.S. Cl. ................................. 119/28.5; 5/110
[58] Field of Search .................... 119/28.5, 474, 119/482; 5/110, 111, 200.1, 201, 114

[56] References Cited

U.S. PATENT DOCUMENTS

| | | | |
|---|---|---|---|
| 1,820,284 | 8/1931 | Mills | 119/28.5 |
| 1,976,234 | 10/1934 | Larson | 119/482 |
| 2,238,982 | 4/1941 | Norton | 119/28.5 |
| 2,651,058 | 9/1953 | Almoslino | 5/110 |
| 2,980,058 | 4/1961 | Hoffman | 119/28.5 |
| 3,006,319 | 10/1961 | McCrory | 119/28.5 |
| 3,125,663 | 3/1964 | Hoffman | 119/28.5 |
| 3,814,058 | 6/1974 | Thompson | 119/482 |
| 3,989,008 | 11/1976 | Neumann | 119/28.5 |
| 4,187,564 | 2/1980 | Alomar | 5/114 |
| 4,663,787 | 5/1987 | Kolsch | 5/110 |
| 4,688,281 | 8/1987 | Lantz | 5/111 |
| 5,144,911 | 9/1992 | Moore et al. | 119/28.5 |
| 5,301,377 | 4/1994 | Kim | 5/110 |
| 5,555,576 | 9/1996 | Kim | 5/114 |
| 5,577,465 | 11/1996 | Cook | 119/498 |
| 5,699,568 | 12/1997 | Couldridge | 5/110 |

Primary Examiner—Robert P. Swiatek
Assistant Examiner—Elizabeth Shaw
Attorney, Agent, or Firm—Seed and Berry LLP

[57] ABSTRACT

A pet bed including a frame, a flexible sheet member suspended from the frame, and a rigid sheet supported by the flexible sheet member; the flexible sheet member, having interconnection members which may be formed as side panels with sleeves formed at the ends thereof for receiving respective cross members and a pocket into which the rigid panel may be removably received.

14 Claims, 5 Drawing Sheets

BED FOR ANIMALS

TECHNICAL FIELD

This invention relates to beds for animals, and more specifically, to animal beds suspended from a frame.

BACKGROUND OF THE INVENTION

While there are many designs for animal beds, these designs have basically fallen into two broad categories. The first design category provides a rigid platform which is supported on the ground, floor or other surface. Such a design is exemplified in the traditional basket on the floor. For the animal's comfort, a pillow is often placed in the basket.

This first design category presents several problems. One problem is that the animal is positioned adjacent the ground or floor, thereby exposing the animal to drafts, as well as, the cold and often damp ground. Condensation is often created by the difference in temperature between the animal's body and the colder ground, causing molding and eventually rotting. The problem is well known, and many attempts have been made to remedy the problem including the designs of the second category.

The second design category addresses the problem by moving the animal up, off of the ground. This category is exemplified by designs which suspend a flexible support member from a frame. The animal sits or sleeps on the flexible sheet, which is usually made from a cloth material such as canvas. This category of design presents other well recognized problems. One problem is the lack of uniform support provided by the flexible sheet. The many attempts which have been made to address this problem mostly take the form of tensioning the flexible sheet. This is not a practical solution since the force required to maintain the flexible sheet substantially flat is so great. Even at high tension the flexible sheet will move under the weight of the animal, which will scare most animals. Another problem of these suspended designs is that the load is not evenly distributed by the flexible sheet to the cross members. A related problem is the lack of stability induced by the uneven load distribution.

SUMMARY OF THE INVENTION

A pet bed including a frame, a flexible sheet member suspended from the frame, and a rigid sheet supported by the flexible sheet member is provided for overcoming the problems presented by prior designs.

The frame of the pet bed includes a set of support members and a set of cross members supported above the ground or other surface by the support members. A flexible sheet member has interconnection members, or side panels, with sleeves formed at the ends thereof for receiving respective cross members. The flexible sheet member is suspended by the sleeves from the cross members of the frame. The flexible sheet member also defines a pocket into which the rigid panel may be removably received. A cushion or cushioning material may also be inserted into the pocket for providing added comfort to the animal.

The frame and the flexible sheet member spaces the animal away from the ground or other surface to protect the animal from drafts or exposure to the cold, damp ground. The rigid panel provides solid footing when the animal walks on the bed, which is an important factor in accustoming the animal to the bed. The rigid panel provides support for the animal's back. The rigid panel also distributes the load more evenly to the flexible sheet member, thereby distributing the load more evenly amongst the cross members and enhancing the stability of the animal bed. The interconnection members and sleeves of the flexible sheet member also serve as side panels to additionally protect the animal from drafts and to prevent the animal from accidentally falling out of the animal bed.

DETAILED DESCRIPTION OF THE INVENTION

Figure 1:
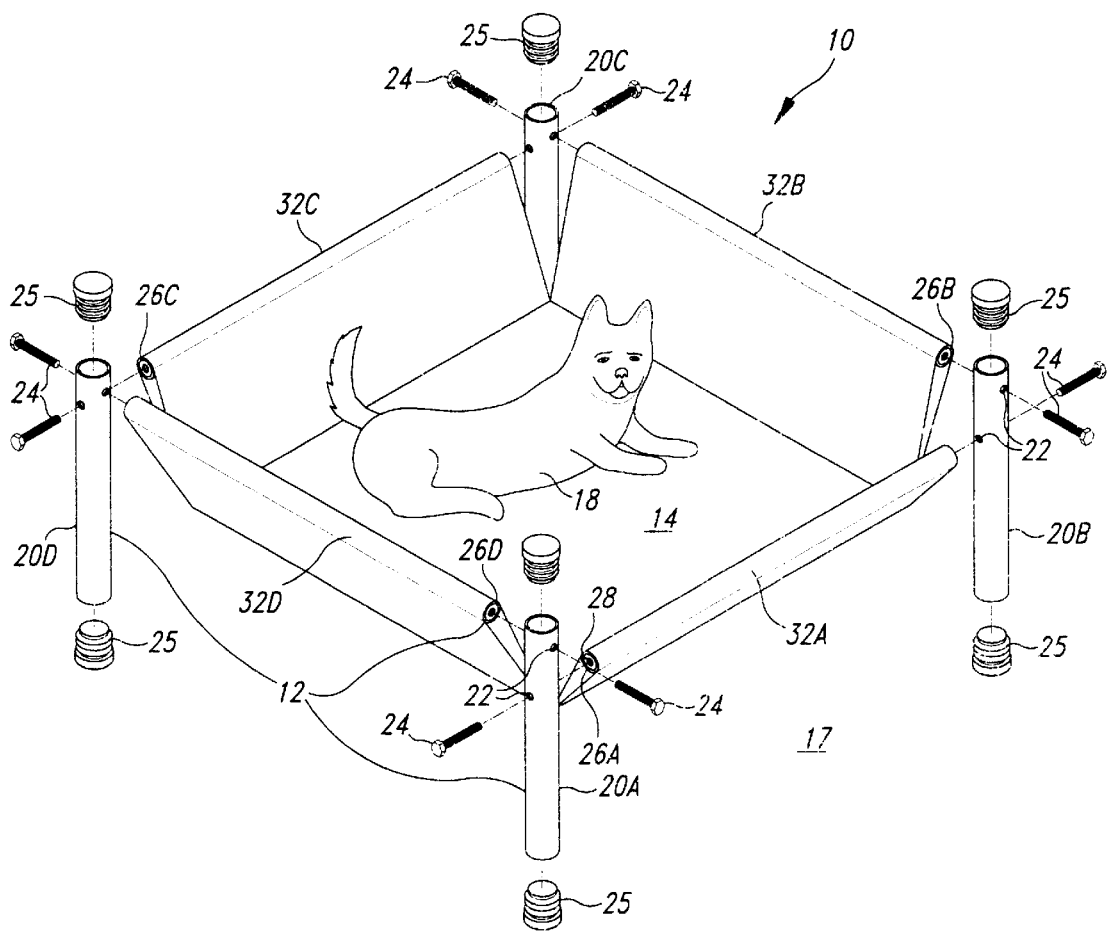
FIG. 1 is a perspective, exploded view of an exemplary embodiment of the animal bed.

With reference to FIG. 1, an animal bed 10 according to one embodiment of the invention is shown. The animal bed 10 includes a frame 12 and a flexible sheet member 14 suspended from the frame 12. The animal bed 10 also includes a rigid panel or rigid bottom 16 (FIGS. 2 and 3), which is supported by the flexible sheet member 14 above a surface 17 and which defines an animal receiving area.

With continuing reference to FIG. 1, the frame 12 includes a set of support members 20A–20D. In the exemplary embodiment, four support members 20A, 20B, 20C and 20D are shown. Each of the support members 20A–20D have a pair of apertures 22 defined transversely to their longitudinal axis. Each of the transverse apertures 22 is sized to receive one of a set of bolts 24. End caps 25, may be provided to protect floors, animals and people from the ends of the support members 20A–20D.

With further reference to FIG. 1, the frame 12 also includes a set of cross members 26A–26D. In the exemplary embodiment, four cross members 26A, 26B, 26C and 26D are shown in a rectangular arrangement. Other arrangements of cross members are possible. For example, in FIG. 7 a single C-shaped cross member 26A is shown. Alternatively, two cross members forming a V-shape or a D-shape may be employed. Three cross members may be employed to form a triangular shape. In other words, any number of cross members formed in a stable arrangement and defining an area suitable for an animal will suffice. The number of support members may also be varied. For example, with further reference to FIG. 7, a C-shaped cross member may be supported from directly from a single wall 27 by brackets or by a cantilever mounting. Alternatively, a single elongated support member may be employed in conjunction with the wall mounting. Any number of support members which provide a stable arrangement, and which is capable of supporting the animal's weight will suffice to practice the invention.

With reference to FIG. 1, each of the cross members 26A–26D has an aperture 28 formed longitudinally therein at each end thereof. Each of the longitudinal apertures 28 is sized for receiving one of the set of bolts 24 therein whereby the cross members 26A–26D may be secured to the support members 20A–20D. The cross members 26A–26D are supported above the ground, floor or other surface 17 by the support members 20A–20D. In the exemplary embodiment, one of the cross members 26A is lower than the other three cross members 26B–26D, so as to provide easy access to the bed 10 for the animal 18.

Figure 4:
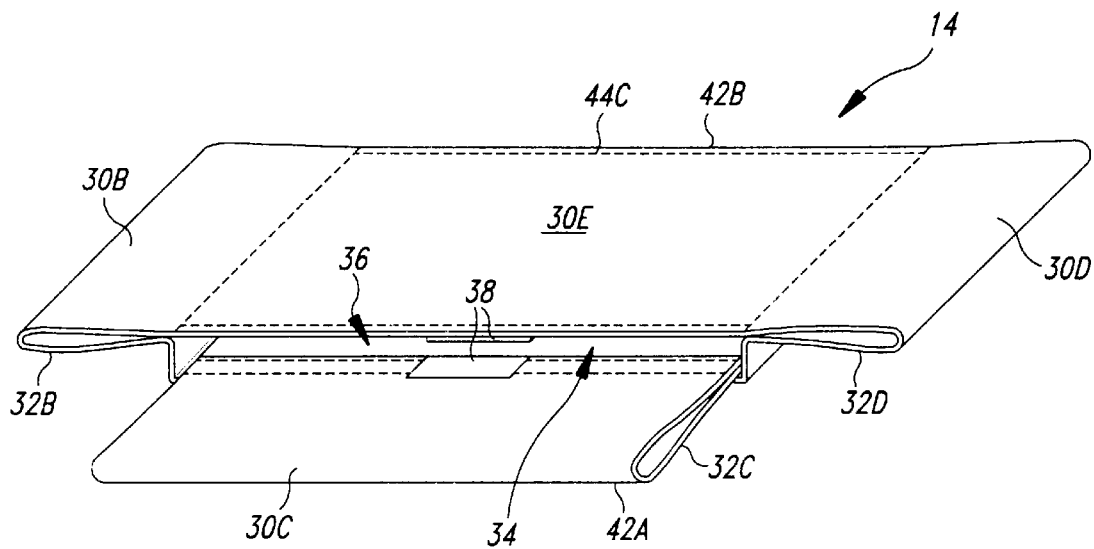
FIG. 4 is a top rear perspective view of the flexible member of the animal bed of FIG. 1.
Figure 5:
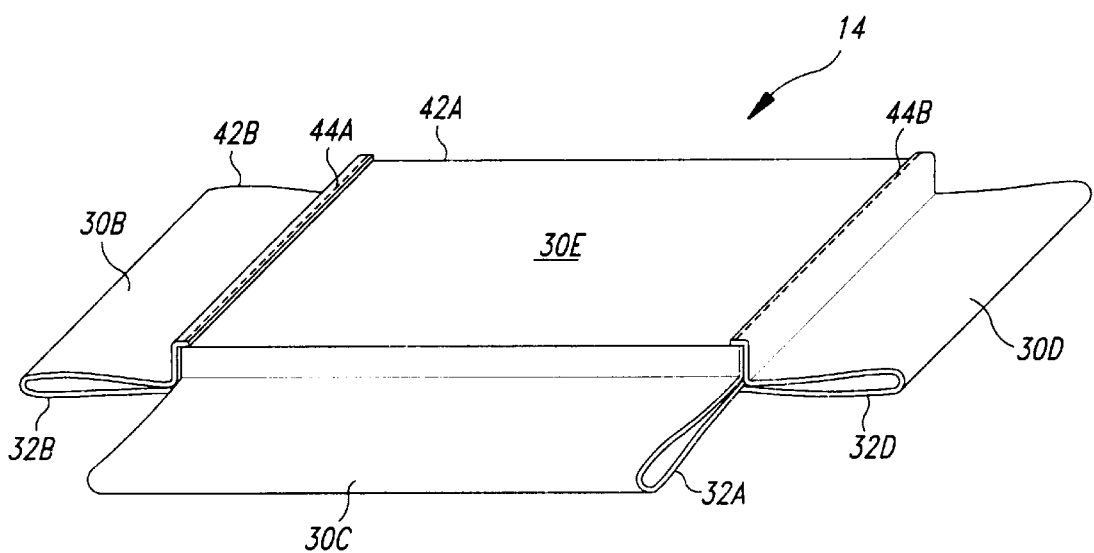
FIG. 5 is a bottom front perspective view of the flexible member of the animal bed of FIG. 1.
Figure 7:
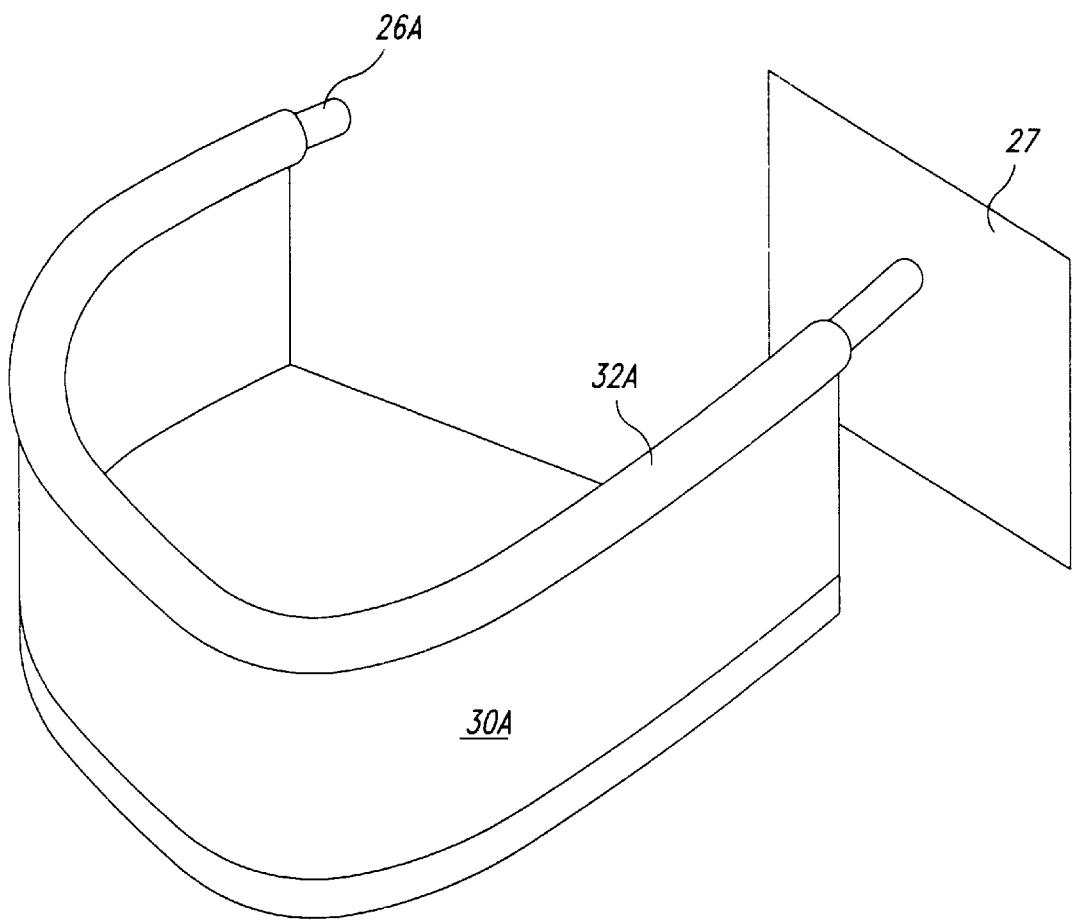
FIG. 7 is a left front perspective view of an alternative exemplary embodiment of the invention having a single cross member.

While the flexible sheet member 14 may be formed of any flexible material, canvas or a like heavy cloth material is preferred. With reference to FIGS. 4 and 5, in the exemplary embodiment, the flexible sheet member 14 is a substantially cross shape, having two pairs of opposing interconnect members 30A–30D extending outwardly from a bottom 30E, the interconnect members 30A–30D forming side panels of the bed. The interconnect members 30A–30D can take any form which is suitable for suspending the rigid member from the cross members. For example, the interconnect member may be a line, rope, light gauge wire, or more preferably a web, side panel or sleeve. In the exemplary embodiment, each of the interconnect members or side panels 30A, 30B, 30C, 30D terminate in a sleeve 32A–32D which is adapted to receive a respective one of the cross members 26A–26D. Alternatively, as shown in FIG. 7, the flexible sheet member 14 may be formed with a single side panel 30A having a single sleeve 32A formed at an end thereof. Any number of side panels or sleeves which provide a stable arrangement capable of supporting the animal's weight will suffice to practice the invention.

Figure 2:
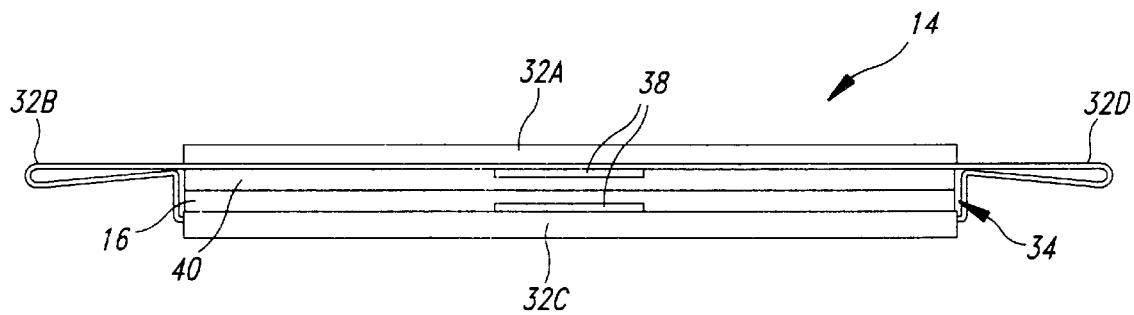
FIG. 2 is rear elevational view of flexible member of the animal bed of FIG. 1.
Figure 3:
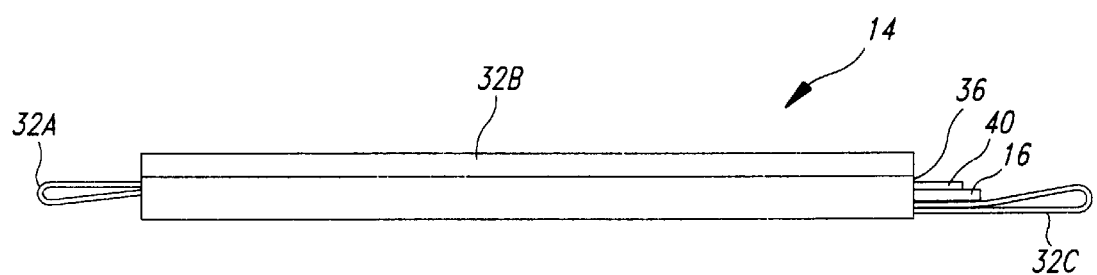
FIG. 3 is a right side elevational view of the flexible member of the animal bed of FIG. 1.

With reference to FIGS. 2, 3 and 4, while the rigid panel 16 may simply lie on top of the flexible sheet member 14, in the exemplary embodiment the portion of the flexible sheet member 14 forming the bottom 30E defines a pocket 34 (FIGS. 2 and 4) for receiving the rigid panel 16. The pocket 34 has a mouth 36 (FIGS. 3 and 4) and may include a fastener 38 (FIGS. 2 and 4) located proximate the mouth 36. The fastener 38 may be hook and loop fastener, a zipper, or any other fastener. Additionally, a cushion or cushioning material 40 (FIGS. 2 and 3) may be received within the pocket 34 above the rigid panel 16. The cushion or cushioning material 40 provides added comfort for the animal 18.

Figure 6:
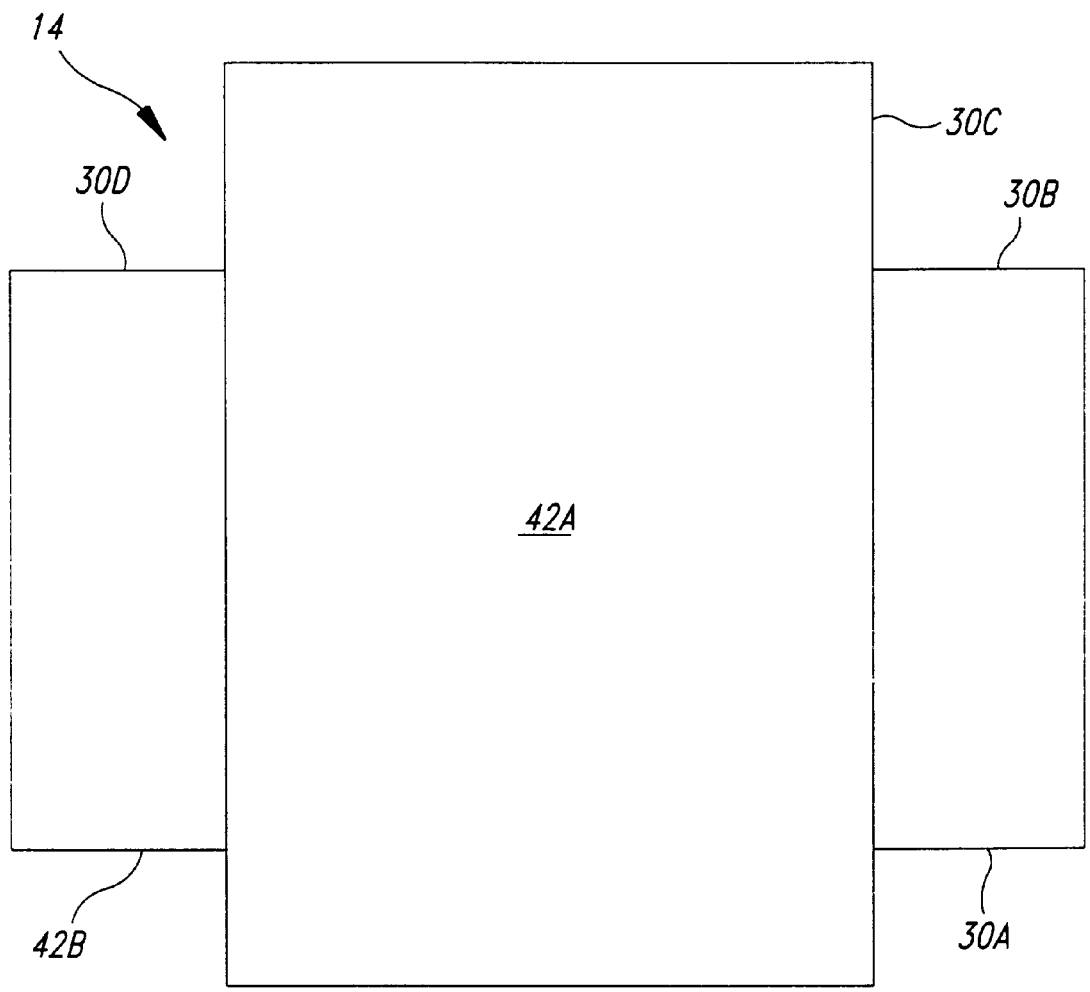
FIG. 6 is a bottom plan view of the flexible member of the animal bed of FIG. 1, before the sleeves are formed.

The flexible sheet member 14 can be formed from a single panel of material which is cut to a cross shape. Alternatively, as shown in FIG. 6, the flexible sheet member 14 may be formed from a pair of rectangular panels of material 42A, 42B. One panel 42A is placed above the other panel 42B and is oriented at a right angle so as to form the cross shape. With particular references to FIGS. 4 and 5, the pair of rectangular panels 42A, 42B may be stitched together or otherwise joined at three of the four lines 44A–44C where their edges overlap. This secures the panels 42A, 42B together to form the flexible sheet member 14 and also defines the pocket 34 between the panels 42A, 42B. The flexible sheet member may take any convenient shape which provides a sufficient area for the animal. The shape of the bottom of the flexible sheet will normally be similar to the shape defined by the cross members of the frame.

With particular reference to FIGS. 4 and 5, an end of each of the side panels 30A–30D may be folded back on itself for forming the sleeves 32A–32D. Again, the material may be stitched or joined by any other conventional methods for securing the sleeves 32A–32D. The sleeve 32A which is to be received about the lower of the four cross members 26A should be shorter than the other sleeves 26B–26D to provide proper support and to evenly distribute the load.

All of the edges of the flexible sheet member 14 may be folded back on themselves and stitched or otherwise joined in place to prevent fraying and to provide added strength to the flexible sheet member 14.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. An animal bed comprising:

a plurality of support members;

a plurality of cross members supported by the support members;

a plurality of side panels extending substantially downward from the cross members; and a substantially rigid bottom defining an animal receiving area, the substantially rigid bottom coupled to the cross members by the side panels for supporting the substantially rigid bottom above a surface.

2. The animal bed of claim 1 further comprising: a flexible sheet member attached to the side panels, the substantially rigid bottom supportingly received by the flexible sheet member.

3. The animal bed of claim 2 wherein the substantially rigid bottom is received in the pocket formed by a portion of the flexible sheet member.

4. The animal bed of claim 3 wherein the flexible sheet member is formed from two rectangular panels of flexible material secured together to form a cross, the cross having a first pair of opposed side panels and a second pair of opposed side panels, each of the side panels of the first pair and the second pair of opposed side panels defining a sleeve for receiving a respective one of the set of cross members of the frame, the first panel of flexible material and the second panel of flexible material defining a pocket therebetween, the pocket adapted for receiving the rigid sheet of material therein.

5. A bed comprising:

a frame having at least one cross member;

at least one interconnect member downwardly extending from the cross member; and a substantially rigid panel defining a pet receiving area, the substantially rigid panel coupled to the cross member by the interconnect member.

6. The bed of claim 5 further comprising:

a flexible sheet member supporting the rigid panel, the flexible sheet member suspended from the cross member by the interconnect member.

7. The bed of claim 6 wherein: the interconnect member is a web.

8. The bed of claim 6 wherein: the interconnect member forms a side panel extending downward from the cross member to the rigid panel.

9. The bed of claim 8 wherein: the side panel includes a sleeve for receiving the cross member therethrough.

10. The bed of claim 6 wherein: a portion of the flexible sheet member defines a pocket; and the rigid panel is received within the pocket of the flexible sheet member.

11. The bed of claim 10 further comprising: a cushioning material received in the pocket of the flexible sheet member.

12. An article for being suspended from a frame for supporting a rigid panel of material, the article comprising:

a sheet of flexible material, the sheet having a first sleeve for receiving a first cross member of the frame therethrough, a second sleeve for receiving a second cross member therethrough, a third sleeve for receiving a third cross member therethrough, and a pocket with an opening for receiving the rigid panel therein, wherein the first, the second and the third sleeves each form at least a portion of a wall extending upwardly from the rigid panel to form at least a partial enclosure.

13. The article of claim 12 wherein the sheet of flexible material has a fourth sleeve for receiving a fourth cross member of the frame and wherein the fourth sleeve is positioned to form at least a partial opening in the wall extending upwardly from the rigid panel.

14. An article for being suspended from a set of cross members of a frame for supporting a rigid sheet of material, the article comprising:

a first rectangular panel of flexible material;

a second rectangular panel of flexible material secured to the first rectangular panel of flexible material to form a cross, the cross having a first pair of opposed side panels and a second pair of opposed side panels, each of the side panels of the first pair and the second pair of opposed side panels defining a sleeve for receiving a respective one of the set of cross members of the frame, the first panel of flexible material and the second panel of flexible material defining a pocket therebetween, the pocket adapted for receiving the rigid sheet of material therein.

\* \* \* \* \*